United States Patent
Xu et al.

(10) Patent No.: US 8,126,905 B2
(45) Date of Patent: Feb. 28, 2012

(54) SYSTEM, METHOD, AND COMPUTER-READABLE MEDIUM FOR OPTIMIZING THE PERFORMANCE OF OUTER JOINS

(75) Inventors: Yu Xu, San Diego, CA (US); Olli Pekka Kostamaa, Santa Monica, CA (US)

(73) Assignee: Teradata US, Inc., Dayton, OH (US)

( * ) Notice: Subject to any disclaimer, the term of this patent is extended or adjusted under 35 U.S.C. 154(b) by 532 days.

(21) Appl. No.: 12/235,652

(22) Filed: Sep. 23, 2008

(65) Prior Publication Data
US 2010/0082600 A1    Apr. 1, 2010

(51) Int. Cl.
*G06F 17/30* (2006.01)
(52) U.S. Cl. ........................................ 707/764
(58) Field of Classification Search .............. 707/764
See application file for complete search history.

(56) References Cited

U.S. PATENT DOCUMENTS

| | | | | |
|---|---|---|---|---|
| 5,774,692 | A * | 6/1998 | Boyer et al. | 1/1 |
| 6,081,801 | A * | 6/2000 | Cochrane et al. | 1/1 |
| 6,470,331 | B1 * | 10/2002 | Chen et al. | 707/718 |
| 2003/0078909 | A1 * | 4/2003 | Pham et al. | 707/1 |

* cited by examiner

*Primary Examiner* — Hung Q Pham
(74) *Attorney, Agent, or Firm* — Steve McDonald; Michael Chan (57) ABSTRACT

A system, method, and computer-readable medium for optimizing the performance of outer joins in a parallel processing system are provided. Predicates involving only attributes of a left table of a left outer join are pushed down to the outer relation for left outer joins having join predicates involving left table attributes and/or predicates involving attributes of both the right and left table. In such an instance, the rows of the left table may be partitioned into two sub-relations according to the predicate involving only attributes of the left table. Rows of the left table are allocated to a first sub-relation if the rows satisfy the predicate involving only attributes of the left table and rows of the left table are allocated to a second sub-relation if the rows fail to satisfy the predicate involving only attributes of the left table. Accordingly, only rows of the first sub-relation are required to be left outer joined with the right table. Advantageously, a reduction in the requisite number of rows to be redistributed and joined is facilitated. The disclosed embodiments may be similarly applied for optimization of right outer joins. Further, embodiments for optimizing full outer joins are disclosed.

14 Claims, 6 Drawing Sheets

Productivity 520

| ID (520a) | Name (520b) | Sales (520c) |
|---|---|---|
| 0001 (510a) | White | 180 |
| 0002 (510b) | Smith | 28 |
| 0003 (510c) | Doe | 15 |
| 0004 (510d) | Lewis | 120 |
| 0005 (510e) | Andrews | 35 |

Figure 5B

550
Employee 570

| ID (570a) | Name (570b) | Experience (570c) | Phone_Num (570d) |
|---|---|---|---|
| 0001 (560a) | White | 15 | 555-1111 |
| 0002 (560b) | Smith | 5 | 555-2222 |
| 0003 (560c) | Doe | 1 | 555-3333 |
| 0004 (560d) | Lewis | 7 | 555-4444 |
| 0005 (560e) | Andrews | 4 | 555-5555 |

| Name (620a) | Sales (620b) | Experience (620c) | Phone_Num (620d) |
|---|---|---|---|
| White (610a) | 180 | NULL | NULL |
| Smith (610b) | 28 | 5 | 555-2222 |
| Doe (610c) | 15 | 1 | 555-3333 |
| Lewis (610d) | 120 | NULL | NULL |
| Andrews (610e) | 35 | NULL | NULL |

SYSTEM, METHOD, AND COMPUTER-READABLE MEDIUM FOR OPTIMIZING THE PERFORMANCE OF OUTER JOINS

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In massively parallel processing (MPP) systems, the processing costs for performing parallel joins can become undesirable. As is understood, a join comprises a structured query language (SQL) operation that combines records from two or more tables. Efficient parallel joins are critical to the performance of parallel database systems.

A relation may be divided among a plurality of processing modules in the MPP system. Such a mechanism is referred to herein as partitioning. Typically, a relation is partitioned on a primary index by hashing the rows on the primary index and distributing the rows to a particular processing module based on the primary index hash value as described more fully hereinbelow. Assuming that the join operation includes predicates that do no include the primary index on which the relations are partitioned, redistribution and/or duplication of the tables is required to complete the join operation such that rows from the relations that match on the join predicate(s) are located at common processing modules. In the event that the tables are significantly large, the redistribution or duplication costs may become undesirably excessive.

SUMMARY

Disclosed embodiments provide a system, method, and computer readable medium for optimizing the performance of outer joins in a parallel processing system. Predicates involving only attributes of a left table of a left outer join are pushed down to the outer relation for left outer joins having join predicates involving left table attributes and/or predicates involving attributes of both the right and left table. In such an instance, the rows of the left table may be partitioned into two sub-relations according to the predicate involving only attributes of the left table. Particularly, rows of the left table are allocated to a first sub-relation if the rows satisfy the predicate involving only attributes of the left table and rows of the left table are allocated to a second sub-relation if the rows fail to satisfy the predicate involving only attributes of the left table. Accordingly, only rows of the first sub-relation are required to be left outer joined with the right table. Advantageously, a reduction in the requisite number of rows to be redistributed and joined is facilitated. The disclosed embodiments may be similarly applied for optimization of right outer joins. Further, embodiments for optimizing full outer joins are disclosed.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
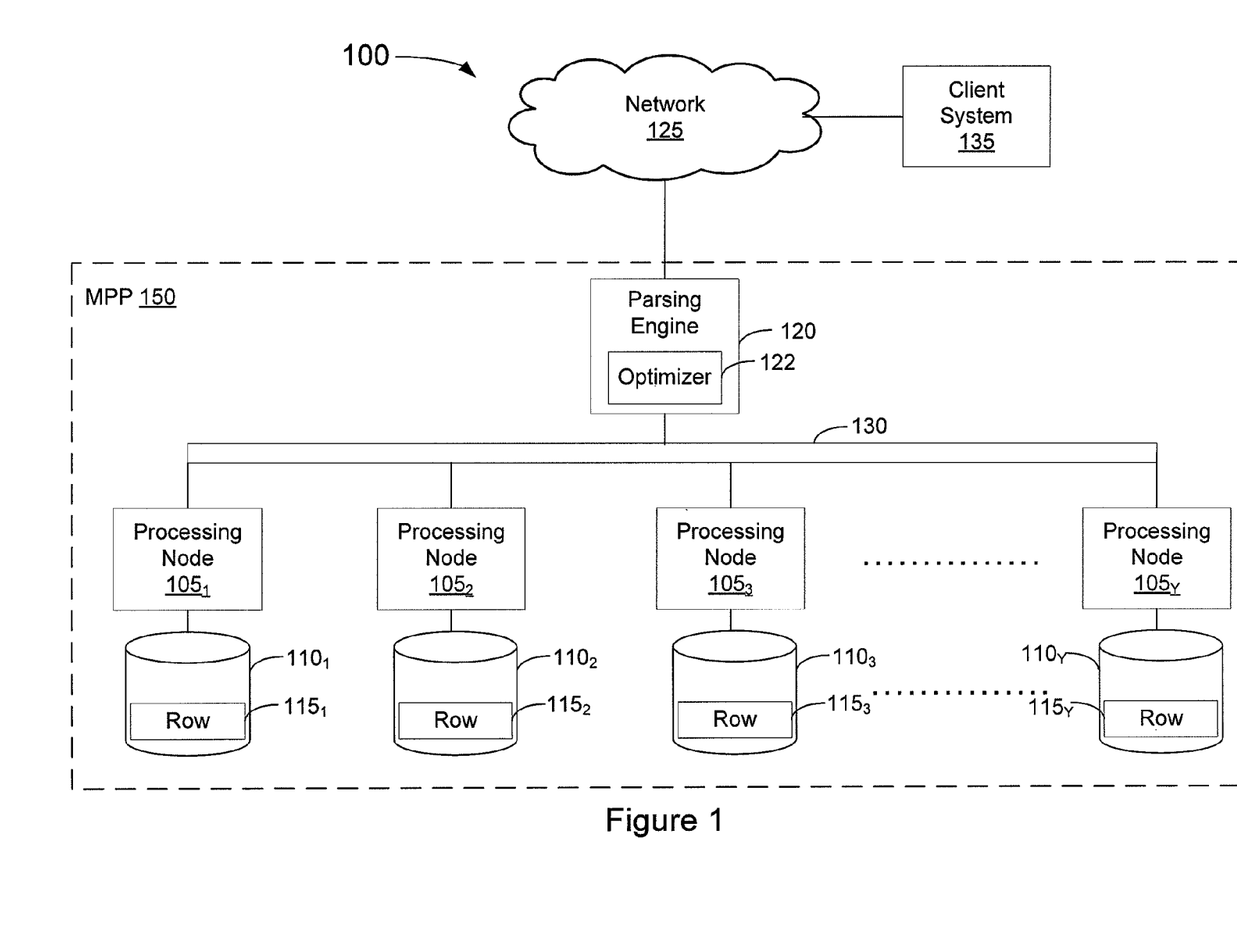
FIG. 1 depicts a diagrammatic representation of an exemplary architecture for a large database system that is suited for implementing optimized parallel join operations in accordance with disclosed embodiments.

FIG. 1 depicts a diagrammatic representation of an exemplary architecture for a large database system 100, such as a Teradata Active Data Warehousing System, that is suited for implementing optimized parallel join operations in accordance with disclosed embodiments. The database system 100 includes a relational database management system (RDBMS) built upon a massively parallel processing (MPP) system 150.

As shown, the database system 100 includes one or more processing nodes $105_{1 \ldots Y}$ that manage the storage and retrieval of data in data-storage facilities $110_{1 \ldots Y}$. Each of the processing nodes may host one or more physical or virtual processing modules, such as one or more access module processors (AMPs). Each of the processing nodes $105_{1 \ldots Y}$ manages a portion of a database that is stored in a corresponding one of the data-storage facilities $110_{1 \ldots Y}$. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Y}$ of the tables are stored across multiple data-storage facilities $110_{1 \ldots Y}$ to ensure that the system workload is distributed evenly across the processing nodes $105_{1 \ldots Y}$. A parsing engine 120 organizes the storage of data and the distribution of table rows $115_1..._Y$ among the processing nodes $105_1..._Y$ and accesses processing nodes $105_1..._Y$ via an interconnect 130. The parsing engine 120 also coordinates the retrieval of data from the data-storage facilities $110_1..._Y$ in response to queries received from a user, such as one using a client computer system 135 connected to the database system 100 through a network 125 connection. The parsing engine 120, on receiving an incoming database query, applies an optimizer 122 component to the query to assess the best plan for execution of the query. Selecting the optimal query-execution plan includes, among other things, identifying which of the processing nodes $105_1..._Y$ are involved in executing the query and which database tables are involved in the query, as well as choosing which data-manipulation techniques will serve best in satisfying the conditions of the query. Database statistics are used in making these assessments during construction of the query-execution plan. For example, database statistics may be used by the optimizer to determine data demographics, such as attribute minimum and maximum values and data ranges of the database. The database system typically receives queries in a standard format, such as the Structured Query Language (SQL) put forth by the American National Standards Institute (ANSI).

Figure 2:
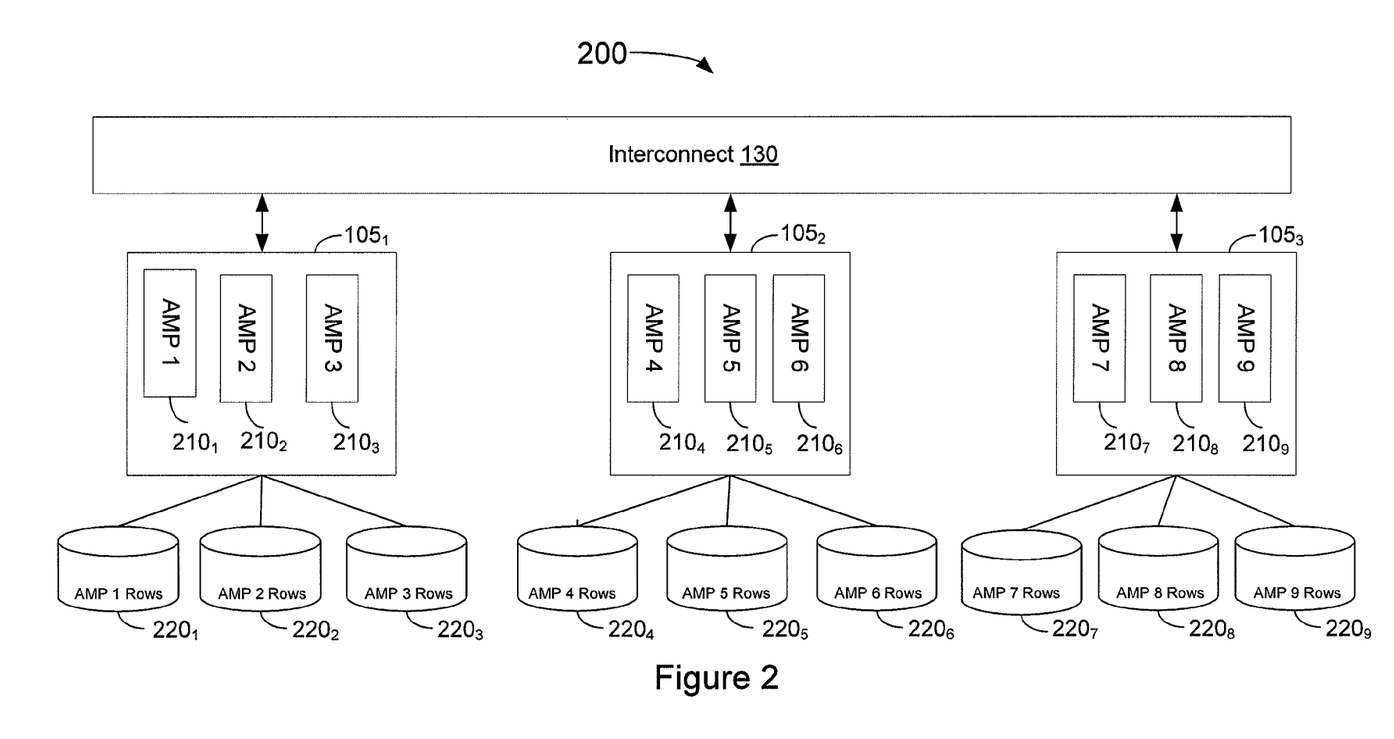
FIG. 2 is a diagrammatic representation of a massively parallel processing configuration suitable for implementing optimized parallel join operations in accordance with disclosed embodiments.

FIG. 2 is a diagrammatic representation of an MPP configuration 200 suitable for implementing optimized parallel join operations in accordance with disclosed embodiments. In the illustrative example, each of the processing nodes $105_1$-$105_3$ are each configured with three respective AMPs $210_1$-$210_9$. The rows $115_1..._Y$ of tables have been distributed across the nine AMPs $210_1$-$210_9$ hosted by processing nodes $105_1$-$105_3$ such that each of the AMPs is allocated rows $220_1$-$220_9$.

Figure 3:
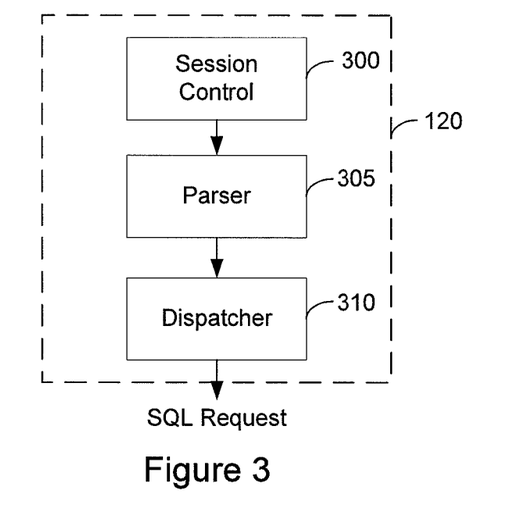
FIG. 3 is a diagrammatic representation of a parsing engine implemented in accordance with an embodiment.
Figure 4:
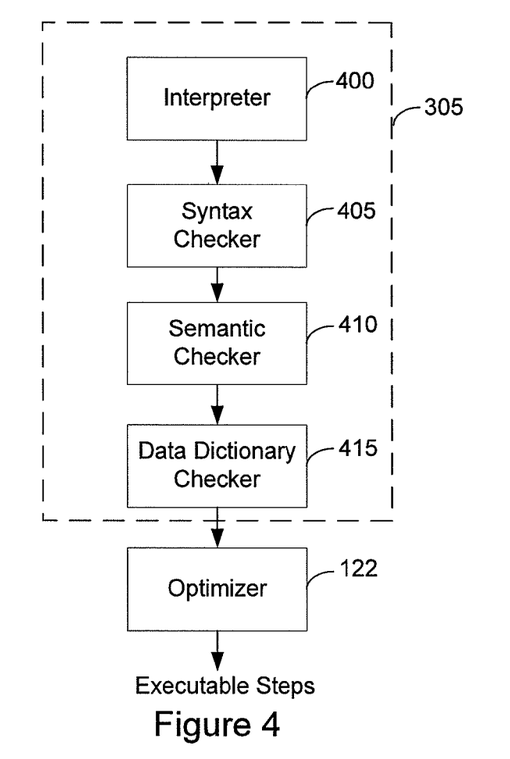
FIG. 4 is a diagrammatic representation of a parser implemented in accordance with an embodiment.

In one example system, the parsing engine 120 is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request.

Figure 5A:
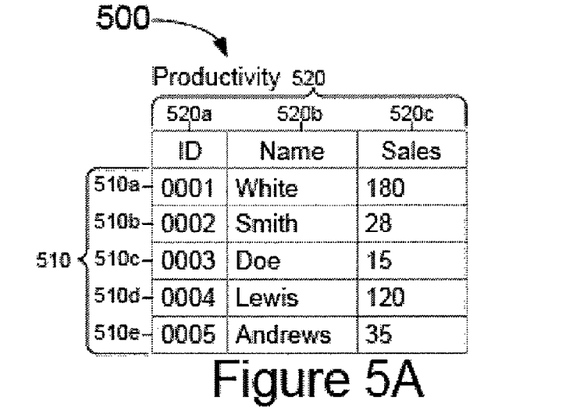
FIGS. 5A-5B are diagrammatic representation of exemplary tables on which the performance of outer joins may be improved in accordance with disclosed embodiments.
Figure 5B:
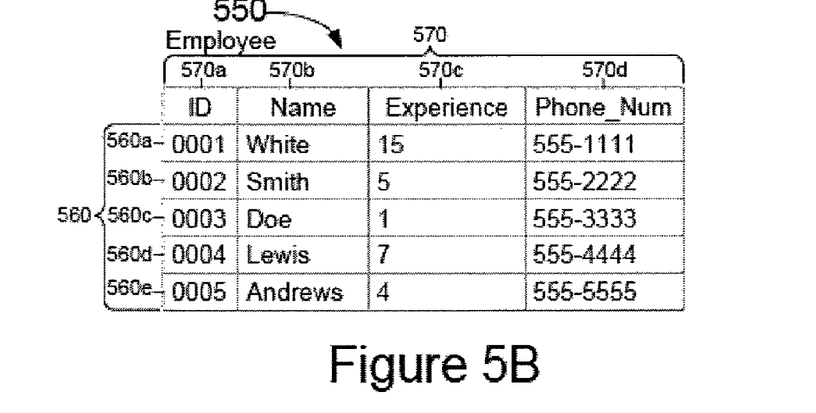

FIG. 5 is a diagrammatic representation of exemplary tables 500 and 550 on which the performance of outer joins may be improved in accordance with disclosed embodiments. Table 500 comprises a plurality of records 510a-510e (collectively referred to as records 510) and fields 520a-520c (collectively referred to as fields 520). Each record 510, or row, comprises data elements in respective fields 520.

Table 500 has a label, or identifier, assigned thereto. In the present example, table 500 has a label of "Productivity." Fields 520 have a respective label, or identifier, that facilitates insertion, deletion, querying, or other data operations or manipulations of table 500. In the illustrative example, fields 520a-520c have respective labels of "ID", "Name", and "Sales". In a similar manner, table 550, labeled Employee, comprises records 560a-560e (collectively referred to as records 560) and fields 570a-570d (collectively referred to as fields 570). Each record 560 comprises data elements in respective fields 570. Fields 570a-570d have a respective label that facilitates insertion, deletion, querying, or other data operations or manipulations of table 570. In the illustrative example, fields 570a-570d have respective labels of "ID", "Name", "Experience", and "Phone_Num".

In an embodiment, the rows $115_1..._Y$ are distributed or partitioned across the data-storage facilities $110_1..._Y$ by the parsing engine 120 in accordance with their primary index. The primary index defines the columns of the rows that are used for calculating a hash value. A hash function produces the hash value from the values in the columns specified by the primary index. Some portion, possibly the entirety, of the hash value is designated a "hash bucket". The hash buckets are assigned to data-storage facilities $110_1..._Y$ and associated processing modules, such as AMPs $210_1..._Y$ by a hash bucket map. The characteristics of the columns chosen for the primary index determine how evenly the rows are distributed. In this manner, table 500 may be partitioned among a plurality of processing nodes, e.g., among a plurality of the AMPs $210_1$-$210_9$ depicted in FIG. 2, and rows of the table 500 may be stored on data storage facilitates associated with the AMPs $210_1$-$210_9$ and fetched therefrom by respective AMPs. In a similar manner, table 550 may be partitioned among a plurality of processing nodes, e.g., among a plurality of the AMPs $210_1$-$210_9$ depicted in FIG. 2, and rows of the table 550 may be stored on data storage facilitates associated with the AMPs $210_1$-$210_9$ and fetched therefrom by respective AMPs. Thus, records of tables 500 and 550 may be partitioned among AMPs $210_1$-$210_9$. In the event that join predicates include attributes not in the table primary indexes, the tables must be redistributed an/or duplicated among the AMPs such that rows of the tables that have matching join attributes are located at a common AMP. In accordance with disclosed embodiments, optimization mechanisms for left outer joins and full outer joins are provided such that a reduction in the requisite redistribution of rows is facilitated.

As is understood, an SQL JOIN clause combines records from two or more tables resulting in a temporary table, often referred to as a joined table, that holds the results of the join operation. JOIN clauses may comprise an INNER, FULL OUTER, LEFT OUTER, and RIGHT OUTER join.

The join clause includes a predicate(s) that identifies records for joining. If the predicates evaluate in the affirmative, then the record is inserted into the joined table. An outer join does not require each record in the two joined tables to have a matching record. The joined table retains each record even if no other matching record exists. Outer joins may further be classified as left outer joins, right outer joins, and full outer joins depending from which tables the rows are retained.

The result of a left outer join contains all records of the left table even if the join-condition does not find any matching record in the right table. As a result, if the ON clause does not match a particular record in the right table, the join will still return a row in the result but with a NULL in the non-matching column from the right table. Accordingly, a left outer join returns all the values from the left table plus matched values from the right table. In the case of no matching join predicate in a row of the right table, NULLs are returned for the values of non-matching attributes of the right table.

Consider the following exemplary LEFT OUTER JOIN clause for the tables 500 and 550 depicted in FIG. 5:

SELECT Productivity.Name, Productivity.Sales, Employee.Experience, Employee.Phone_Num
FROM Productivity LEFT OUTER JOIN Employee
ON (Productivity.Sales<30 AND Productivity.Name=Employee.Name)

Figure 6:
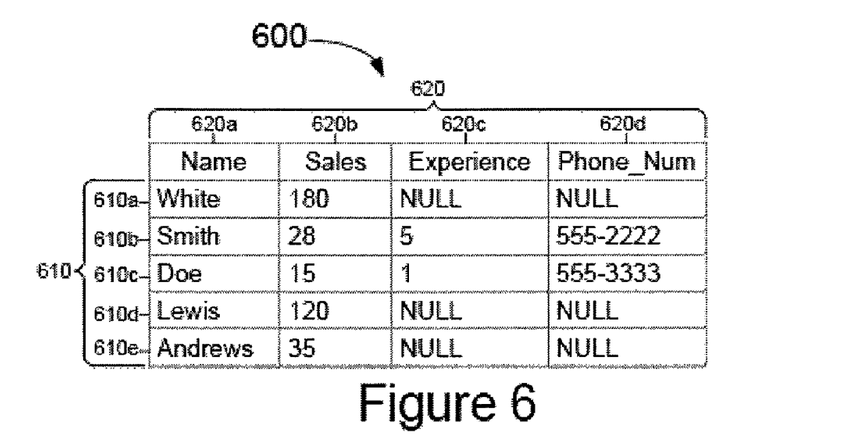
FIG. 6 is a diagrammatic representation of an exemplary temporary table resulting from an outer join in accordance with an embodiment.

The left outer join will provide a joined table including the fields Name and Sales from the Left table, i.e., the Productivity table, and the fields Experience and Phone_Num from the right table, i.e., the Employee table. In the present example, the predicate clause comprises a predicate involving only attributes of the left table—the predicate Productivity.Sales<30. Also, the predicate clause includes a predicate that involves attributes of both the left and right tables—the predicate Productivity.Name=Employee.Name. The Left Outer Join clause will result in a matching table that includes records with the selected fields 620a-620d having values from both the left and right table of records 610b-610c that match on both the predicate clauses and records 610a and 610d-610e with values of the selected fields from the left table that fail to match on both predicate clauses as depicted by the temporary table 600 depicted in FIG. 6. As shown, the records 610a and 610d-610e of the temporary table that result from a failure to match on both predicate clauses have the selected fields of the right table with null values.

In accordance with disclosed embodiments, predicates involving only attributes of the left table are pushed down to the outer relation for left outer joins having join predicates involving left table attributes and/or predicates involving attributes of both the right and left table. In such an instance, the rows of the left table may be partitioned into two sub-relations according to the predicate involving only attributes of the left table. Particularly, rows of the left table are allocated to a first sub-relation if the rows satisfy the predicate involving only attributes of the left table and rows of the left table are allocated to a second sub-relation if the rows fail to satisfy the predicate involving only attributes of the left table. Accordingly, only rows of the first sub-relation are required to be left outer joined with the right table.

Figure 7:
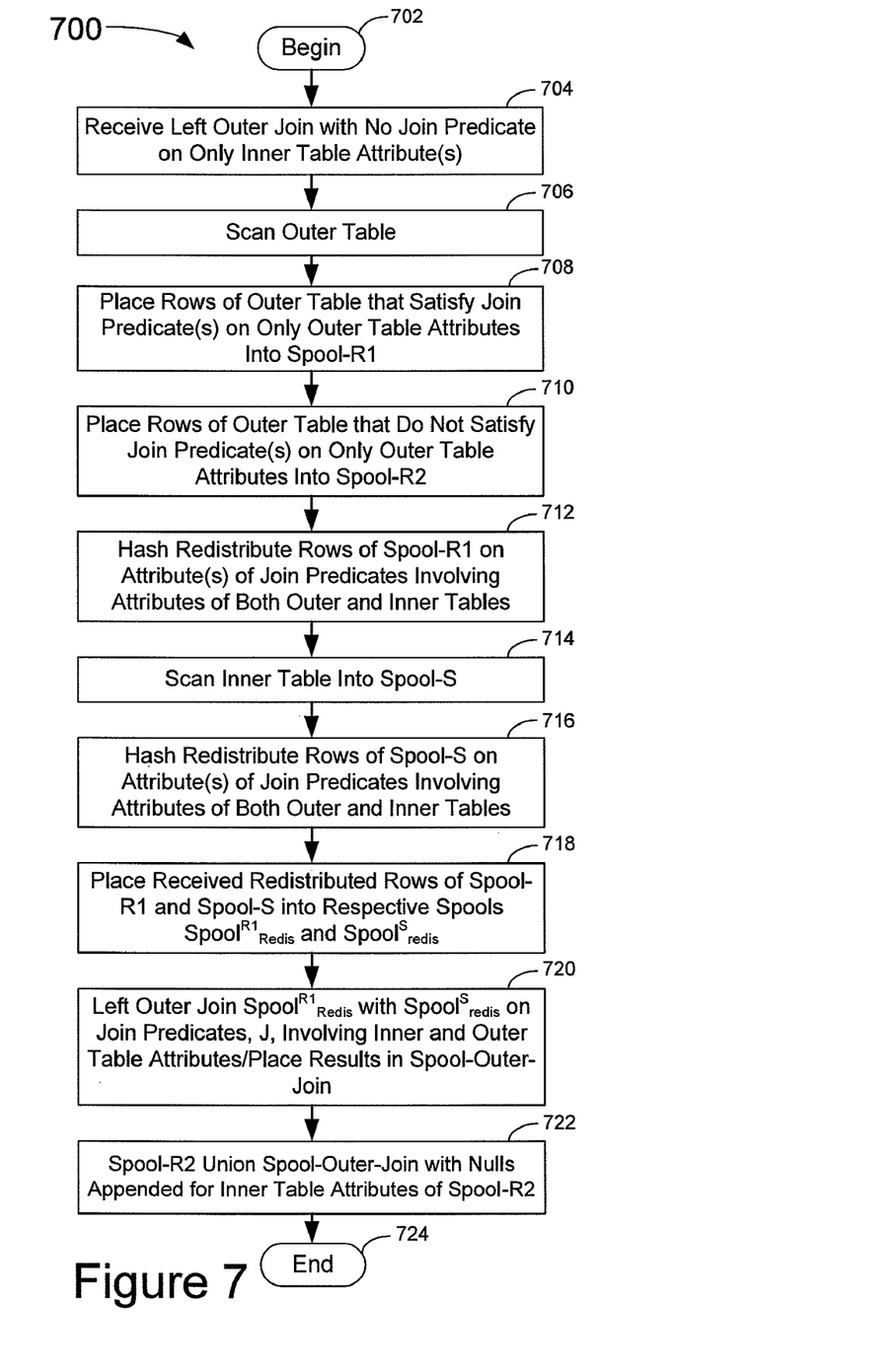
FIG. 7 is a flowchart that depicts processing of an optimized left outer join routine that facilitates performance enhancement in a parallel processing system in accordance with an embodiment.

FIG. 7 is a flowchart 700 that depicts processing of an optimized left outer join routine that facilitates performance enhancement in a parallel processing system in accordance with an embodiment. The processing steps of FIG. 7 may be implemented as computer-executable instructions tangibly embodied on a computer-readable medium executable by a processing system, such as each of the AMPs $210_1$-$210_9$ depicted in FIG. 2.

Assume a left outer join clause according to the following is to be executed in the MPP system 200 depicted in FIG. 2:

select $a^R(R)$, $a^S(S)$
from R left outer join S
on $f^R_o(R)$ and J where $a^R(R)$ is the list of selected attributes from the left table R, $a^S(S)$ is the list of selected attributes from the right table S, $f^R_o(R)$ is a list of predicates involving only attributes from the left table R, and J is a list of predicates each of which involves attributes from both the left table R and the right table S.

The left outer join routine is invoked (step 702), and a left outer join having no join predicates involving only attributes of the inner, or right, table is received (step 704). Assuming the size of the tables R and S requires redistributing both relations R and S, and assuming that the join condition J is not on the primary index column(s) of R and S, performance of the left outer join is enhanced by first scanning the left, or outer, table R (step 706) and allocating rows of the left table R into two sub-relations. Particularly, rows of the outer table, R, that satisfy the join predicate(s), $f^R_o(R)$, involving only attributes of the outer table, R, are allocated to a first spool (designated Spool-R1) (step 708. For example, consider the left outer join operation described above with reference to FIGS. 5 and 6. An AMP that has the row 510b of table 500 places the row 510b in a spool Spool-R1 allocated for the AMP because the row 510b matches the join predicate (Productivity.Sales<30) that involves only attributes of the left table. Rows of the outer table that do not satisfy the join predicate(s), $f^R_o(R)$, involving only attributes of the outer table, R, are allocated to a spool, designated Spool-R2 (step 710). For example, an AMP that has the row 510a places the row 510a into a spool Spool-R2 allocated to the AMP because the row 510a fails to satisfy the join predicate that involves only attributes of the left table. The rows allocated to Spool-R1 are then hash redistributed according to attributes in the predicates, J, that involve attributes of both the left table, R, and the right table, S (step 712). For example, the AMP that has placed the row 510b in the spool Spool-R1 allocated to the AMP then hashes the row 510b on the attribute Productivity.Sales and redistributes the row 510b to an AMP based on the hash value. Rows of the inner or right table, S, are scanned into a spool, designated Spool-S, (step 714). The rows of the inner table, S, in the spool Spool-S are then hash redistributed according to the attributes in J (step 716). For example, an AMP hash redistributes any rows of the right table, S, on the attribute Employee.Name and redistributes the rows based on the hash values.

Rows received at a processing module, e.g., an AMP, as a result of the redistribution are placed into spools allocated for receipt of redistributed rows. For example, rows of Spool-R1 that are received by an AMP as a result of the redistribution of the rows are placed into a spool illustratively designated $Spool^R_{redis}$, and rows of the spool Spool-S that are received by an AMP as a result of the redistribution of the rows of Spool-S are placed into a spool illustratively designated $Spool^S_{redis}$ (step 718).

$Spool^R_{redis}$ and $Spool^S_{redis}$ are then left outer joined on the join predicate(s) J, and the results are placed into a spool (illustratively designated Spool-Outer-Join (step 720). The spool Spool-R2 is then unioned with the spool Spool-Outer-Join with Nulls appended as the values for the selected attributes $a^S(S)$ in Spool-R2 that do not match on the join predicate(s), $f^R_o(R)$ (step 722). The left outer join routine cycle may then end (step 724).

The described steps of the outer join routine are not necessarily indicative of the serialization of the operations being performed. In various embodiments, the processing steps may be performed in varying order, and one or more depicted steps may be performed in parallel with other steps. For example, one or more of the processing steps 706-712 may be performed in parallel with one or more of the steps 714-718.

Advantageously, the described left outer join processing routine reduces the number of rows of R to be redistributed and reduces the number of rows of R to be joined with S. Right outer joins may be processed in a similar manner.

In accordance with another embodiment, an optimized full outer join query processing routine is provided. Consider a full outer join according to the following to be executed in the MPP system 200 depicted in FIG. 2:

select $a^R(R)$, $a^S(S)$
from R full outer join S
on $f^R_o(R)$ and $f^S_o(S)$ and J where $a^R(R)$ is the list of selected attributes from the left table R, $a^S(S)$ is the list of selected attributes from the right table S, $f^R_o(R)$ is a list of predicates involving only attributes from the left table R, $f^S_o(S)$ is the list of predicates only on attributes from the right table S, and J is a list of predicates each of which involves attributes from both the left table R and the right table S.

Figure 8:
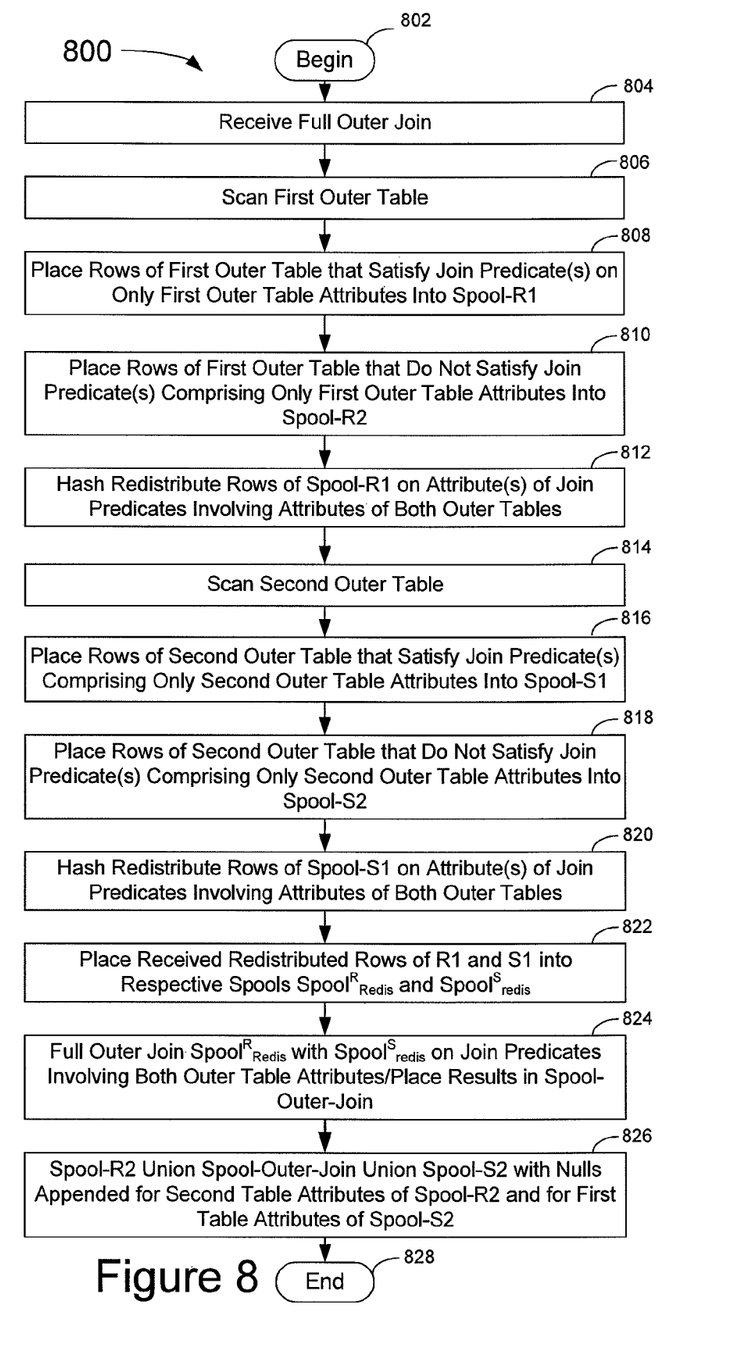
FIG. 8 is a flowchart that depicts processing of an optimized full outer join routine that facilitates performance enhancement in a parallel processing system in accordance with an embodiment.

FIG. 8 is a flowchart 800 that depicts processing of an optimized full outer join routine that facilitates performance enhancement in a parallel processing system in accordance with an embodiment. The processing steps of FIG. 8 may be implemented as computer-executable instructions tangibly embodied on a computer-readable medium executable by a processing system, such as each of the AMPs $210_1$-$210_9$ depicted in FIG. 2 involved in the full outer join. In the present example, assume the size of the tables R and S requires redistributing both relations.

The full outer join routine is invoked (step 802), and a full outer join is received (step 804). The first outer table, R, is scanned (step 806), and rows of the first outer table, R, that satisfy the join predicates that involve only attributes of the first outer table are placed into a first spool (designated Spool-R1) (step 808). That is, rows of the first outer table, R, that satisfy the join predicate(s) $f^R_o(R)$ are placed into a spool Spool-R1. Rows of the first outer table, R, that do not satisfy the join predicates that involve only attributes of the first outer table, R, are placed into a second spool (designated Spool-R2) (step 810). That is, rows of the first outer table, R, that do not satisfy the join predicate(s) $f^R_o(R)$ are placed into a spool Spool-R2. Rows of the spool Spool-R1 are then hash redistributed according to the attributes in the join predicate(s) that involve attributes of both the first outer table, R, and the second outer table, S (step 812). That is, rows of the spool Spool-R1 are hash redistributed according to the attributes of the join predicate(s) J.

In a similar manner, the second outer table, S, is scanned (step 814), and rows of the second outer table, S, that satisfy the join predicates that involve only attributes of the second outer table, S, are placed into a spool (designated Spool-S1) (step 816). That is, rows of the second outer table, S, that satisfy the join predicate(s) $f^S_o(S)$ are placed into a spool Spool-Sl. Rows of the second outer table, S, that do not satisfy the join predicates that involve only attributes of the second outer table, S, are placed into another spool (designated Spool-S2) (step 818). That is, rows of the second outer table, S, that do not satisfy the join predicate(s) $f^S_o(S)$ are placed into a spool Spool-S2. Rows of the spool Spool-S1 are then hash redistributed according to the attributes in the join predicate(s) that involve attributes of both the first outer table, R, and the second outer table, S (step 820). That is, rows of the spool Spool-S1 are hash redistributed according to the attributes of the join predicate(s) J.

Rows received at a processing module, e.g., an AMP, as a result of the redistribution are placed into spools allocated for receipt of redistributed rows. For example, rows of Spool-R1 that are received by an AMP as a result of the redistribution of the rows are placed into a spool illustratively designated Spool$^R_{redis}$, and rows of the spool Spool-S1 that are received by an AMP as a result of the redistribution of the rows of Spool-S1 are placed into a spool illustratively designated Spool$^S_{redis}$ (step 822). Spool$^R_{redis}$ and Spool$^S_{redis}$ are then left outer joined on the join predicate(s) J, and the results are placed into a spool (illustratively designated Spool-Outer-Join) (step 824). The spool Spool-R2 is then unioned with the spool Spool-Outer-Join which is unioned with the spool Spool-S2 with nulls appended as the values for the selected attributes $a^S(S)$ in the spool Spool-R2 and as the values for the selected attributes of $a^R(R)$ in the spool Spool-S2 (step 826). The full outer join routine cycle may then end (step 828).

The described steps of the full outer join routine are not necessarily indicative of the serialization of the operations being performed. In various embodiments, the processing steps may be performed in varying order, and one or more depicted steps may be performed in parallel with other steps. For example, one or more of the processing steps 806-812 may be performed in parallel with one or more of the steps 814-820.

As described, embodiments for optimizing the performance of outer joins in a parallel processing system are provided. Predicates involving only attributes of a left table of a left outer join are pushed down to the outer relation for left outer joins having join predicates involving left table attributes and/or predicates involving attributes of both the right and left table. In such an instance, the rows of the left table may be partitioned into two sub-relations according to the predicate involving only attributes of the left table. Particularly, rows of the left table are allocated to a first sub-relation if the rows satisfy the predicate involving only attributes of the left table and rows of the left table are allocated to a second sub-relation if the rows fail to satisfy the predicate involving only attributes of the left table. Accordingly, only rows of the first sub-relation are required to be left outer joined with the right table. Advantageously, a reduction in the requisite number of rows to be redistributed and joined is facilitated. The disclosed embodiments may be similarly applied for optimization of right outer joins. Further, embodiments for optimizing full outer joins are disclosed.

The flowcharts of FIGS. 7-8 depict process serialization to facilitate an understanding of disclosed embodiments and are not necessarily indicative of the serialization of the operations being performed. In various embodiments, the processing steps described in FIGS. 7-8 may be performed in varying order, and one or more depicted steps may be performed in parallel with other steps. Additionally, execution of some processing steps of FIGS. 7-8 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of optimizing processing of a join operation in a parallel processing system, comprising:
   receiving an outer join operation on a first table and a second table that includes a first join predicate that includes at least one attribute of the first table and a second join predicate that includes at least one attribute of the first table and the second table;
   scanning, by a plurality of processing modules of the parallel processing system, the first table;
   placing, by a first set including at least one processing module of the plurality of processing modules, rows of the first table that satisfy the first join predicate in a respective first spool allocated to the first set including at least one processing module;
   placing, by a second set including at least one processing module of the plurality of processing modules, rows of the first table that do not satisfy the first join predicate in a respective second spool allocated to the second set including at least one processing module;
   redistributing, by the first set including at least one processing module of the plurality of processing modules, each row of the first spool to a corresponding processing module based on the at least one attribute of the second join predicate of each row;
   redistributing, by at least one allocated processing module of the plurality of processing modules, each row of the second table to a corresponding processing module based on the at least one attribute of the second join predicate;
   placing, by a third set including at least one processing module of the plurality of processing modules, each row of the first spool redistributed to the third set in a third spool allocated to the third set including at least one processing module;
   placing, by a fourth set including at least one processing module of the plurality of processing modules, each row of the second table redistributed to the fourth set in a fourth spool allocated to the fourth set including at least one processing module;
   performing, by a fifth set including at least one processing module of the plurality of processing modules, a left outer join operation on tables represented by rows of the third and fourth spools allocated to the fifth set; and
   placing, by the fifth set including at least one processing module of the plurality of processing modules, results of the left outer join operation in a fifth spool allocated to the fifth set.

2. The method of claim 1, wherein redistributing each row of the first spool comprises:
   generating, by a respective processing module, a respective hash value of each row of the first spool; and
   redistributing, by the third set, each row of the first spool to a corresponding processing module based on the hash value.

3. The method of claim 1, further comprising:
   performing, by a sixth set including at least one processing module of the plurality of processing modules, a union of the second spool and the fifth spool; and
   appending, by a seventh set including at least one processing module of the plurality of processing modules, null values to second table attributes of rows of the second spool.

4. A method of optimizing processing of a join operation in a parallel processing system, comprising:
   receiving an outer join operation on a first table and a second table that includes a first join predicate that includes at least one attribute of the first table and a second join predicate that includes at least one attribute of the first table and the second table;
   scanning, by a plurality of processing modules of the parallel processing system, the first table;
   placing, by a first set including at least one processing module of the plurality of processing modules, rows of the first table that satisfy the first join predicate in a respective first spool allocated to the first set including at least one processing module;
   placing, by a second set including at least one processing module of the plurality of processing modules, rows of the first table that do not satisfy the first join predicate in a respective second spool allocated to the second set including at least one processing module;
   redistributing, by the first set including at least one processing module of the plurality of processing modules, each row of the first spool to a corresponding processing module based on the at least one attribute of the second predicate of each row;
   wherein the outer join operation comprises a full outer join and includes a third join predicate that includes at least one attribute of the second table, the method further comprising:
   scanning, by the plurality of processing modules, the second table;
   placing, by a third set including at least one processing module of the plurality of processing modules, rows of the second table that satisfy the third join predicate in a respective third spool allocated to the third set including at least one processing module;
   placing, by a fourth set including at least one processing module of the plurality of processing modules, rows of the second table that do not satisfy the third join predicate in a respective fourth spool allocated to the fourth set including at least one processing module; and
   redistributing, by the third set including at least one processing module of the plurality of processing modules, each row of the third spool to corresponding processing module based on the at least one attribute of the second predicate of each row.

5. The method of claim 4, further comprising:
   placing, by the first set including at least one processing module of the plurality of processing modules, each row of the first spool redistributed to a fifth set including at least one processing module in a fifth spool allocated to the fifth set including at least one processing module; and
   placing, by the third set including at least one processing module of the plurality of processing modules, each row of the third spool redistributed to a sixth set including at least one processing module in a sixth spool allocated to the sixth set including at least one processing module;

performing, by at least one allocated processing module of the plurality of processing modules, a full outer join operation on tables represented by rows of the fifth and sixth spools on the at least one attribute of the second join predicate;

placing, by a seventh set including at least one processing module of the plurality of processing modules, results of the full outer join in a respective seventh spool allocated to the seventh set including at least one processing module;

performing, by an eighth set including at least one processing module of the plurality of processing modules, a union of the second spool with the fourth spool and the seventh spool; and appending null values to attributes of the second table of rows of the second spool and to attributes of the first table of rows of the fourth spool.

6. A computer-readable medium having computer-executable instructions for execution by a processing system, the computer-executable instructions for optimizing processing of a join operation in a parallel processing system, the computer-executable instructions, when executed, cause the processing system to:

receive an outer join operation on a first table and a second table that includes a first join predicate that includes at least one attribute of the first table and a second join predicate that includes at least one attribute of the first table and the second table;

scan, by a plurality of processing modules, the first table;

place, by a first set including at least one processing module of the plurality of processing modules, rows of the first table that satisfy the first join predicate in a respective first spool allocated to the first set including at least one processing module;

place, by a second set including at least one processing module of the plurality of processing modules, rows of the first table that do not satisfy the first join predicate in a respective second spool allocated to the second set including at least one processing module;

redistribute, by the first set including at least one processing module of the plurality of processing modules, each row of the first spool to a corresponding processing module based on the at least one attribute of the second join predicate of each row;

redistribute, by at least one allocated processing module of the plurality of processing modules, each row of the second table to a corresponding processing module based on the at least one attribute of the second join predicate;

place, by a third set including at least one processing module of the plurality of processing modules, each row of the first spool redistributed to the third set in a third spool allocated to the third set including at least one processing module;

place, by a fourth set including at least one processing module of the plurality of processing modules, each row of the second table redistributed to the fourth set in a fourth spool allocated to the fourth set including at least one processing module;

perform, by a fifth set including at least one processing module of the plurality of processing modules, a left outer join operation on table represented by rows of the third and fourth spools allocated to the fifth set; and place, by the fifth set including at least one processing module of the plurality of processing modules, results of the left outer join in a fifth spool allocated to the fifth set.

7. The computer-readable medium of claim 6, wherein the instructions that, when executed, cause the processing system to redistribute each row of the first spool comprise instructions that:

generate, by a respective processing module, a respective hash value of each row of the first spool; and redistribute, by the third set, each row of the first spool to a corresponding processing module based on the hash value.

8. The computer-readable medium of claim 6, further comprising instructions that, when executed, cause the processing system to:

perform, by a sixth set including at least one processing module of the plurality of processing modules, a union of the second spool and the fifth spool allocated to the sixth set; and append, by the sixth set including at least one processing module of the plurality of processing modules, null values to second table attributes of rows of the second spool.

9. A computer-readable medium having computer-executable instructions for execution by a processing system, the computer-executable instructions for optimizing processing of a join operation in a parallel processing system, the computer-executable instructions, when executed, cause the processing system to:

receive an outer join operation on a first table and a second table that includes a first join predicate that includes at least one attribute of the first table and a second join predicate that includes at least one attribute of the first table and the second table;

scan, by a plurality of processing modules, the first table;

place, by a first set including at least one processing module of the plurality of processing modules, rows of the first table that satisfy the first join predicate in a respective first spool allocated to the first set including at least one processing module;

place, by a second set including at least one processing module of the plurality of processing modules, rows of the first table that do not satisfy the first join predicate in a respective second spool allocated to the second set including at least one processing module;

redistribute, by the first set including at least one processing module of the plurality of processing modules, each row of the first spool to a corresponding processing module based on the at least one attribute of the second predicate of each row;

wherein the outer join operation comprises a full outer join and includes a third join predicate that includes at least one attribute of the second table, the computer-readable medium further comprising instructions that, when executed, cause the processing system to:

scan, by the plurality of processing modules, the second table;

place, by a third set including at least one processing module of the plurality of processing modules, rows of the second table that satisfy the third join predicate in a respective third spool allocated to the third set including at least one processing module;

place, by a fourth set including at least one processing module of the plurality of processing modules, rows of the second table that do not satisfy the third join predicate in a respective fourth spool allocated to the fourth set including at least one processing module; and redistribute, by the third set including at least one processing module of the plurality of processing modules, each row of the third spool to corresponding processing module based on at least one attribute of the second predicate of each row.

10. The computer-readable medium of claim 9, further comprising instructions that, when executed, cause the processing system to:
   place, by the first set including at least one processing module of the plurality of processing modules, each row of the first spool redistributed to a fifth set including at least one processing module in a fifth spool allocated to the fifth set including at least one processing module; and
   place, by the third set including at least one processing module of the plurality of processing modules, each row of the third spool redistributed to a sixth set including at least one processing module in a sixth spool allocated to the sixth set including at least one processing module;
   perform, by at least one allocated processing module of the plurality of processing modules, a full outer join operation on tables represented by rows of the fifth and sixth spools on the at least one attribute of the second join predicate;
   place, by a seventh set including at least one processing module of the plurality of processing modules, results of the full outer join in a respective seventh spool allocated to the seventh set including at least one processing module;
   perform, by an eighth set including at least one processing module of the plurality of processing modules, a union of the second spool with the fourth spool and the seventh spool; and
   append null values to attributes of the second table of rows of the second spool and to attributes of the first table of rows of the fourth spool.

11. A database management system, comprising:
   a plurality of processing nodes each including at least one respective processing module;
   an interconnect that communicatively couples each of the plurality of processing nodes; and
   at least one storage device to which a respective set of rows of a first table and a second table involved in a join operation are allocated to each of the plurality of processing modules, wherein the join operation comprises an outer join on a first table and a second table that includes a first join predicate that includes at least one attribute of the first table and a second join predicate that includes at least one attribute of the first table and the second table, wherein
   (i) a first set including at least one processing module of the plurality of processing modules places rows of the first table that satisfy the first join predicate in a respective first spool allocated to the first set including at least one processing module,
   (ii) a second set including at least one processing module of the plurality of processing modules places rows of the first table that do not satisfy the first join predicate in a respective second spool allocated to the second set including at least one processing module,
   (iii) the first set including at least one processing module of the plurality of processing modules redistributes each row of the first spool to a corresponding processing module based on the at least one attribute of the second join predicate of each row,
   (iv) at least one allocated processing module of the plurality of processing modules redistributes each row of the second table to a corresponding processing module based on the at least one attribute of the second join predicate,
   (v) a third set including at least one processing module of the plurality of processing modules places each row of the first spool redistributed to the third set in a third spool allocated to the third set including at least one processing module,
   (vi) a fourth set including at least one processing module of the plurality of processing modules places each row of the second table redistributed to the fourth set in a fourth spool allocated to the fourth set including at least one processing module,
   (vii) a fifth set including at least one processing module of the plurality of processing modules performs a left outer join operation on tables represented by rows of the third and fourth spools allocated to the fifth set including at least one processing module,
   (viii) the fifth set including at least one processing module of the plurality of processing modules places results of the left outer join in a fifth spool allocated to the fifth set including at least one processing module,
   (ix) a sixth set including at least one processing module of the plurality of processing modules performs a union of the second spool and the fifth spool, and
   (x) a seventh set including at least one processing module of the plurality of processing modules appends null values to second table attributes of rows of the second spool.

12. The system of claim 11, wherein the outer join comprises a left outer join, the first table comprises a left table of the join operation, and the second table comprises a right table of the join operation.

13. The system of claim 11, wherein the outer join comprises a right outer join, the first table comprises a right table of the join operation, and the second table comprises a left table of the join operation.

14. A database management system, comprising:
   a plurality of processing nodes each including at least one respective processing module;
   an interconnect that communicatively couples each of the plurality of processing nodes; and
   at least one storage device to which rows of a first table and a second table involved in a join operation are allocated to a plurality of processing modules, wherein the join operation comprises an outer join on a first table and a second table that includes a first join predicate that includes at least one attribute of the first table and a second join predicate that includes at least one attribute of the first table and the second table, wherein
   (i) a first set including at least one processing module of the plurality of processing modules places rows of the first table that satisfy the first join predicate in a respective first spool allocated to the first set including at least one processing module,
   (ii) a second set including at least one processing module of the plurality of processing modules places rows of the first table that do not satisfy the first join predicate in a respective second spool allocated to second set including at least one processing module,
   (iii) the first set including at least one processing module of the plurality of processing modules redistributes each row of the first spool to a corresponding processing module based on the at least one attribute of the second join predicate of each row, (iv) the outer join comprises a full outer join and includes a third join predicate that includes at least one attribute of the second table,
(v) a third set including at least one processing module of the plurality of processing modules places rows of the second table that satisfy the third join predicate in a respective third spool allocated to the third set including at least one processing module,
(vi) a fourth set including at least one processing module of the plurality of processing modules places rows of the second table that do not satisfy the third join predicate in a respective fourth spool allocated to the fourth set including at least one processing module, and
(vii) the third set including at least one processing module of the plurality of processing modules redistributes each row of the third spool to corresponding processing module based on the at least one attribute of the second predicate of each row.

* * * * *